No. 640,432. Patented Jan. 2, 1900.
S. J. WETMORE.
LUBRICATOR.
(Application filed May 4, 1897.)
(No Model.)
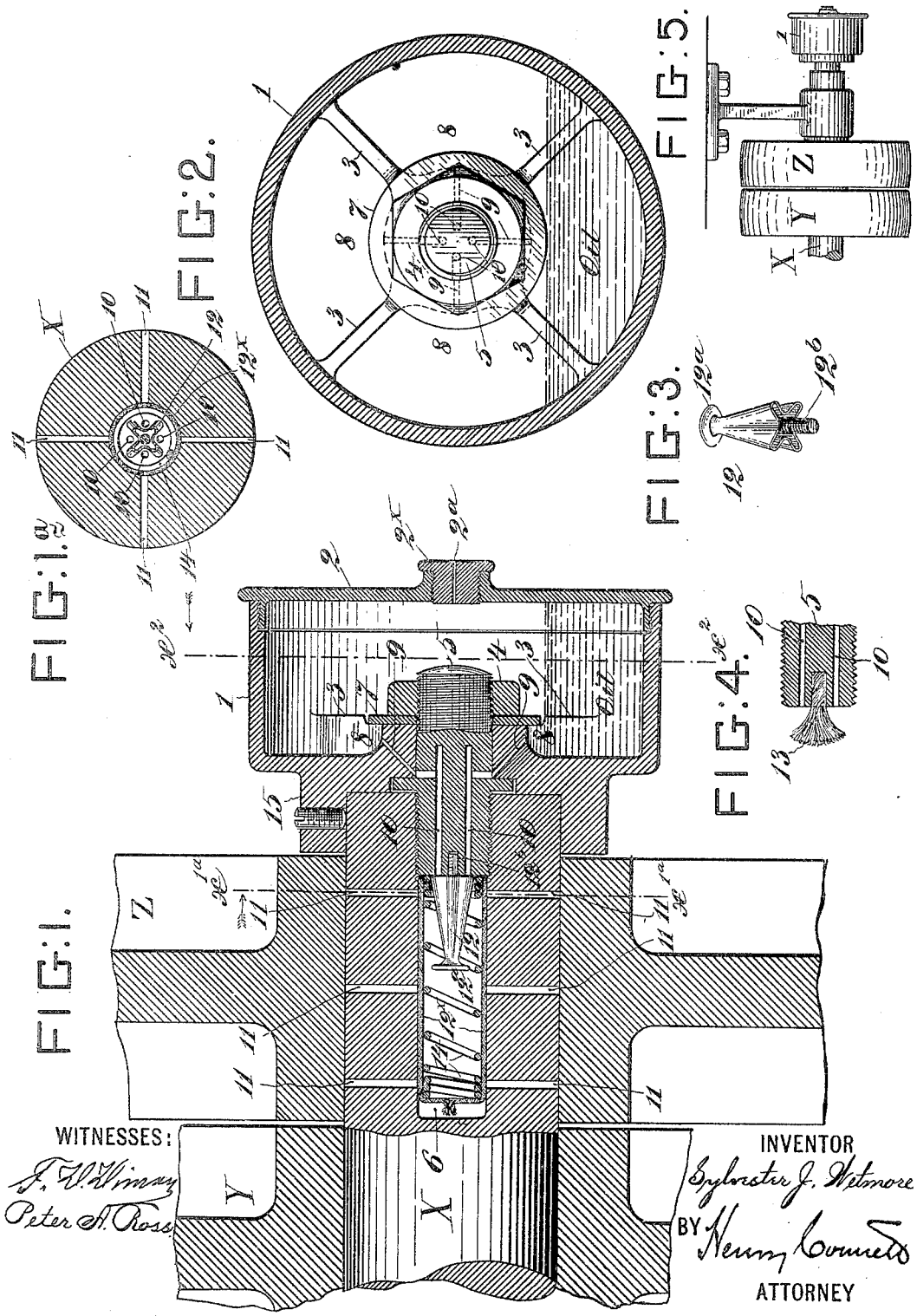
WITNESSES:
INVENTOR
Sylvester J. Wetmore
BY
ATTORNEY

UNITED STATES PATENT OFFICE.

SYLVESTER J. WETMORE, OF NEW YORK, N. Y., ASSIGNOR OF ONE-HALF TO W. OSCAR SHADBOLT, OF SAME PLACE.

LUBRICATOR.

SPECIFICATION forming part of Letters Patent No. 640,432, dated January 2, 1900.

Application filed May 4, 1897. Serial No. 634,989. (No model.)

*To all whom it may concern:*

Be it known that I, SYLVESTER J. WETMORE, a citizen of the United States, residing at New York, (Brooklyn,) in the county of Kings and State of New York, have invented certain new and useful Improvements in Lubricators, of which the following is a specification.

This invention relates to oilers or lubricators for shafting and for pulleys thereon.

It will be understood by those familiar with the subject that when a shaft having on it tight and loose pulleys is rotating the loose pulley rotates with it and requires no lubrication; but when the belt is shifted to the loose pulley the shaft ceases to rotate and the pulley rotates thereon.

The object of the invention is to provide a lubricator which will supply oil to the bearing of the loose pulley to the proper extent when the shaft is not rotating and the pulley is rotating thereon and to cut off the supply when the shaft is rotating.

In the accompanying drawings a lubricator or oiler is illustrated which embodies the invention.

Figure 1 is an axial section of the lubricator and a part of a counter-shaft on which it is mounted, and Fig. 1ª is a transverse section in the plane indicated by the line $x'^{a}$ in Fig. 1. Fig. 2 is a transverse section on line $x^2$ in Fig. 1. Fig. 3 is a perspective view of the oil-guide detached. Fig. 4 is a view illustrating another form of oil-guide. Fig. 5 is a side elevation of the oiler on a small scale, showing a different adaptation of it to the shaft.

The invention requires that the shaft shall have an axial bore extending in from its end to the bearing to be lubricated, and the lubricator or oiler comprises an oil cup or reservoir with a stem which extends into said bore, the oiler fixed to and rotating with the shaft and preferably concentrically therewith. The oil flows through bores or passages in the stem to the axial bore in the shaft and finds its way by lateral passages to the bearing at the surface of the shaft.

X represents any ordinary counter-shaft, and Y and Z represent, respectively, a tight and a loose pulley thereon. Only fragments of these pulleys are shown. It will suffice to say that they may be of the usual kind well known to all machinists. The object of the invention is to supply oil properly to the loose pulley Z to lubricate its bearing on the shaft X, and to effect this the lubricator now to be described is employed.

1 is an oil reservoir or cup, which will be, by preference, circular, as seen in Fig. 2, and have a screw cover or cap 2. In the center of the bottom of the cup is a boss, from which radiate a plurality of webs or partitions 3. In a bore in the bottom of the cup is secured by a nut 4 a stem 5, which is adapted to screw into an axial bore 6, formed in the shaft X. The webs 3, in connection with a washer 7 behind the nut 4, form pockets 8, from each of which an oil hole or passage 9 leads to a longitudinal oil-passage 10 in the stem 5. As herein shown, there are four webs, four pockets, and four oil-passages 10 in the stem 5.

The oil is passed into the oil-reservoir through a filling-aperture in the cap 2, closed by a plug 2×, which has in it an air-hole 2ª. The cup cannot be filled to a height above the center of the cup, and usually it will not be filled to an extent greater than is indicated in Figs. 1 and 2. When the shaft is rotating, the oil is thrown outward by centrifugal force and cannot pass to the bearing through the holes 9; but when the rotation of the shaft is arrested the main portion of the oil settles to the lower side of the cup, and a small quantity thereof will be caught in the pocket 8 which happens to be uppermost. This small portion of the oil will flow through a hole or passage 9 to the connecting-passage 10 in the stem 5, and thence to the bore 6 in the shaft. From the bore it will find its way by a lateral bore or passage 11 in the shaft to the bearing of the loose pulley Z.

In order to prevent the oil from collecting in the bore 6 and perhaps to such an extent as to flow back to the oil cup or reservoir through lower passages 10 and 9, it is preferred to provide an oil-guide to lead the oil into the bore 6 and deliver it in drops at a little distance from the end of the inlet 10. A good form of such a guide is seen *in situ* in Fig. 1, in cross-section in Fig. 1ª, and detached in Fig. 3. This guide 12 consists of a longitudinally-crimped sheet-metal tube provided with a disk or button 12ᵃ at its end, four oil-channels adapted to receive oil from the respective passages 10, and a screw 12ᵇ for securing it in the end of the stem 5. The oil flows down the channel in the guide and drips from the button 12ᵃ. The guide 12 may of course be made of any suitable material. Fig. 4 shows an oil-guide 13, which is formed of a tuft of fibrous material, as wicking, which receives the oil and allows it to drip from its end.

In order to absorb and distribute the oil which enters the bore 6, the distributer shown in Fig. 1 may be employed. This consists of a piece of tubular lamp-wicking 12ˣ, distended by a coil-spring 14 and pushed into the bore 6 in front of the stem 5. This tubular wick may be closed at its farther or front end, but will be open at its rear end next the stem 5 in order that it may receive oil from the passages 10. This wicking receives and absorbs the oil which drips from the oil-guide and allows the oil to pass in a regulated manner to the bearing.

Where the oiler is used on a counter-shaft where the pulleys are outside of the bearing, as seen in Fig. 1, it is convenient to form a collar for the pulleys on the oil cup or reservoir 1, as seen at 15 in Fig. 1, but this is not essential to my invention. Where the bracket or hanger supporting the counter-shaft is outside of the pulleys, as in Fig. 5, the collar 15 will be omitted. Indeed the construction seen in Fig. 5 may be employed in all cases, if preferred, as the collar 15 can be constructed as a separate feature.

It will be understood that while the oiler described is especially well adapted for loose pulleys it may be used for other purposes as well. It will also be understood that while the chamber 6 in the shaft is herein called a "bore," such chamber may be formed in any way known to those skilled in the art.

Having thus described my invention, I claim—

1. The combination with a shaft having a chamber to receive the lubricant, and a passage extending from said chamber to the bearing-surface to be lubricated, of a reservoir for the lubricant mounted on the end of said shaft and communicating with the said chamber therein, said reservoir having in it pockets each provided with a passage for leading the lubricant to the chamber in the shaft.

2. The combination with a shaft having a chamber in it to receive a lubricant, and passages extending from said chamber to the bearing to be lubricated, of a reservoir for the lubricant mounted on the end of said shaft, said reservoir having pockets, and a stem having in it a plurality of oil-passages connecting the respective pockets with the chamber in the shaft, substantially as and for the purposes set forth.

3. An oiler or lubricator adapted for attachment to a shaft having a chamber to receive the lubricant, comprising an oil cup or reservoir 1, having a series of pockets 8, a stem with passages 10, communicating with the respective pockets in the cup, and a stoppered filling-inlet, substantially as set forth.

4. The combination with a shaft having a longitudinal chamber and passages extending therefrom to the bearing to be lubricated, of a reservoir or cup for the lubricant connected with the shaft and communicating with said chamber to supply lubricant thereto, of the distributer in said chamber, said distributer consisting of a tube of fibrous material, and means substantially as described for distending the same.

5. The combination with a shaft having in it a longitudinal chamber with passages leading therefrom to the bearing to be lubricated, of the oiler comprising the cup 1, provided with a plurality of pockets 8, a filling-inlet, a stem 5, having longitudinal passages 10, communicating with the respective pockets in the cup and adapted to lead oil into the chamber in the said shaft, and an oil-guide at the end of said stem 5 within the hollow of the shaft, substantially as and for the purposes set forth.

6. The combination with the oiler or lubricator, having a stem with a series of oil-passages 10 extending through it longitudinally, of the oil-guide 12, having an oil-channel corresponding to each of said passages 10, and a button or disk at its outer end, said guide being fixed in the end of the stem, substantially as set forth.

In witness whereof I have hereunto signed my name in the presence of two subscribing witnesses.

SYLVESTER J. WETMORE.

Witnesses:
HENRY CONNETT,
PETER A. ROSS.